Oct. 10, 1939.   J. T. DICKSON   2,175,380
TORQUE TRANSMITTER
Filed May 11, 1938   2 Sheets-Sheet 2

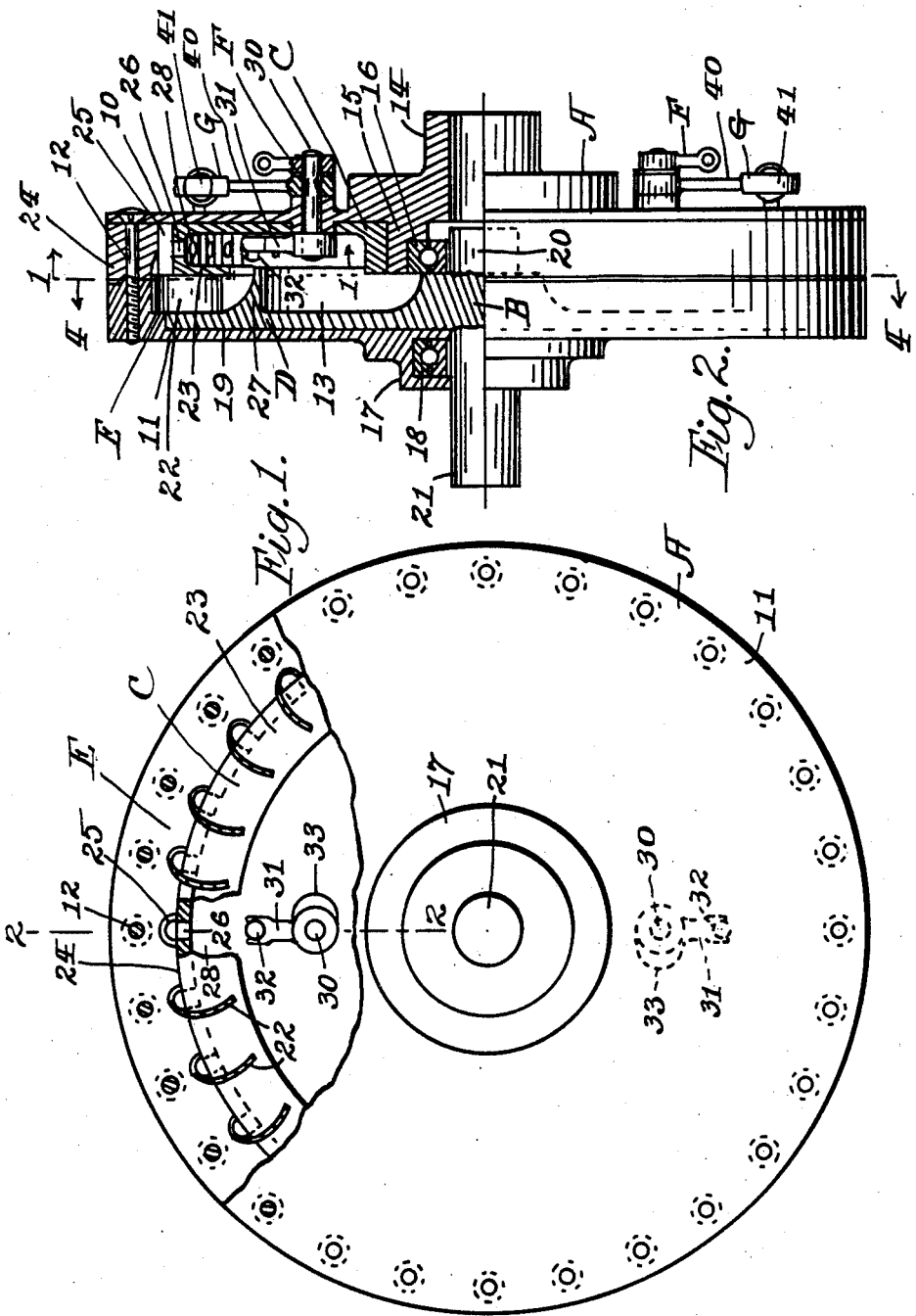

INVENTOR.
James T. Dickson
BY
ATTORNEY.

Patented Oct. 10, 1939

2,175,380

UNITED STATES PATENT OFFICE 2,175,380

TORQUE TRANSMITTER

James T. Dickson, Los Angeles, Calif., assignor to John D. Fredericks, Jr., Los Angeles, Calif.

Application May 11, 1938, Serial No. 207,347

5 Claims. (Cl. 60—54)

My invention relates to a hydraulic torque transmitter of the fluid turbine type in which a plurality of coaxial rotary members cooperate to transmit motion therebetween by the use of fluid. More particularly this invention relates to a device of its kind, the elements of which can be combined and applied as a power transmitter, clutch, brake, speed change device or any other use in which it is desired to effectively transmit motion between two or more rotary elements. The primary object therefore is to provide simple and effective means for transmitting torque in any use desired and with minimum wear. Certain prime movers attain full speed very quickly and at such speed they have a high reserve of power, so that if the driving member is connected with the driven member too suddenly, the members will be subject to excessive strain. It is therefore another object of my improvement to provide a hydraulic torque transmitter which will with a certain amount of reserve delay, act to slowly pick up the load of the driving element so that the driven element may be gradually but steadily accelerated to full speed without overloading the driving element. Another object of the invention is to provide a hydraulic torque transmitter of the class described, which provides variable speed and regulation of speed of the driven element while the prime mover or driving element is running at any speed desired. A further object is to provide a torque transmitter of the type stated in which its parts are subject to a minimum of wear and in which all likelihood of disorder is minimized.

With these and other objects in view my invention comprises the features of construction and combination of parts hereinafter described and claimed.

Figure 4:
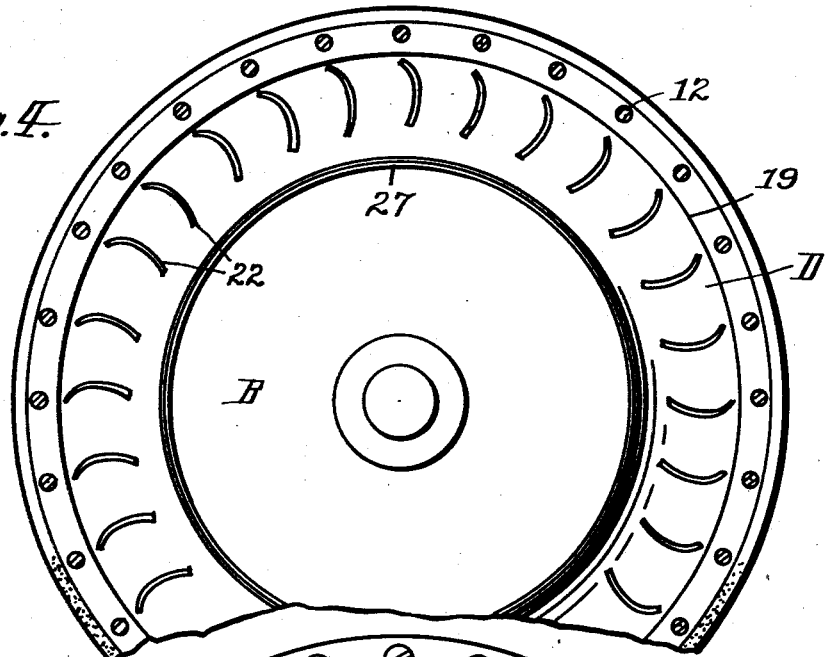
Figure 3:
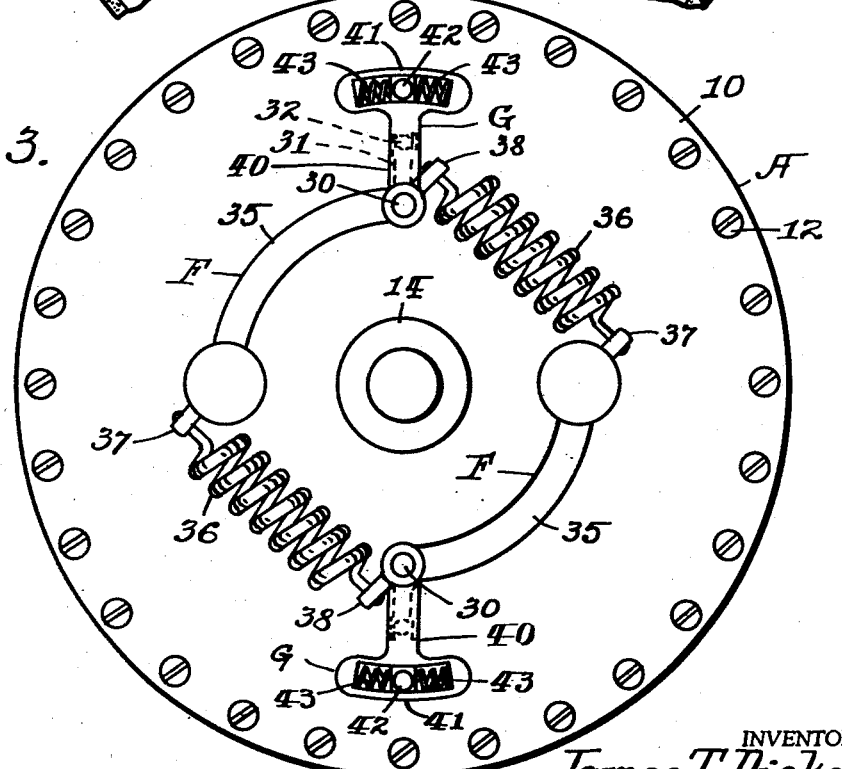

In the accompanying drawings, forming part of this specification, Fig. 1 is an elevation of my invention looking at one side of my improved hydraulic torque transmitter, a portion thereof being broken away and in section on line I—I of Fig. 2, and also a portion of the valve being broken away and in section; Fig. 2 is an elevation looking upon the rim of the structure shown in Fig. 1, one-half thereof being a section taken on line 2—2 of Fig. 1, and part of the governor mechanism being omitted for greater clearness; Fig. 3 is an elevation looking at the side of the structure opposite that shown in Fig. 1, showing the governor mechanism, and Fig. 4 is an elevation looking at the face of part of the rotor and part of the portion of the housing in which it is journaled as indicated approximately by the broken line 4—4 of Fig. 2.

In the drawings, A represents a driving element and B a driven element, which are coaxially arranged and revoluble and adapted to form a torque couple. The driving element resembles a cylindrical housing made in two sections 10 and 11 which overlie each other and are tightly joined together by any suitable means such as screws 12 and forming a chamber 13 within. The member 10 of the housing has a central external hub 14 to which a drive shaft (not shown) may be connected and an inner coaxial hub 15 upon which the rotary valve C is journaled and in which an antifriction bearing 16 is coaxially seated. The housing member 11 is formed with an external central hub 17 in which is seated an antifriction bearing 18.

Seated and revoluble in the circular recess 19 of section 11 is a rotor D which has an inner stud 20 journaled in the bearing 16 and an outwardly extending driven shaft 21 seated in the bearing 18, said parts including hub 14 being coaxially arranged. The rotor D resembles a disk carrying on its inner face an annular series of turbine blades 22 which are adapted to revolve with the rotor in a corresponding annular channel E. This channel is formed by the housing and an inwardly projecting flange 23 on the rim of the rotary valve C. Section 10 of the housing is formed with a cylindrical rim 24 in which the rotary valve is closely fitted and revolves. This rim has an annular series of evenly spaced longitudinally extending fluid conducting passages 25 which are adapted to distribute fluid sealed in the transmitter evenly into the outer portion of the rotor channel E. These passages are controlled by valve C, said valve having a series of radiating ports 26, one for each passage and adapted to regulate the flow of fluid from within the valve outwardly through the passages when the valve is rotated into open position or to entirely check the flow when the valve is rotated into closed position. A small amount of mercury or other fluid is placed in the chamber 13 and the structure sealed. When the device is at rest the fluid seeks the lowest level but when the housing is revolved it is urged by centrifugal force outwardly through the valve ports 26 and passages 25 into the rotor work channel E, thus engaging the tips of the blades 22 and revolving the rotor, which in turn transmits rotary motion to the driven shaft 21. Thus the drum formed by the valve C and its wall 23 form a centrifugal pump causing pressure to be generated in the fluid within the valve housing by centrifugal force caused by the frictional rotation of the fluid engaging the valve walls. The spent fluid is urged inwardly due to pressure difference and diverted into the valve by an annular deflector 27 which is integral with the rotor and spaced inwardly from the inner edges of the flange 23. Thus a circulating passage is formed for conducting the spent liquid from the turbine blades immediately into the valve, from whence it is distributed evenly back to the rotor work channel E in regulated quantity by the rotary valve. The valve it will be noted is formed with an annular cup 28 which is adapted to hold a residual quantity of the mercury or other fluid while urged centrifugally until admitted by the valve into the rotor work channel E. The blades 22 may be of any suitable shape desired, as shown they are concave on their work faces and resemble the usual turbine or Pelton wheel type.

I have found the use of mercury to be a particularly effective fluid engaging medium between the driving and driven elements because of its heavy specific gravity, low frictional resistance and free mobility. Other liquids such as oil however may in certain specific instances be used.

The rotary valve C is rotated to control the action of its ports 26 by a pair of diametrically and concentrically arranged longitudinal shafts 30 which are journaled through the side of member 10 of the housing. Each of these shafts carries on its inner end a crank arm 31, the free end of which slidingly and rotatively engages an inwardly projecting stud 32 on the inner face of the rotary valve. Thus as the shafts 30 are slightly rotated the valve is turned to regulate the ports 26 and either close or modify the corresponding passages 25. Concentric slots 33 in the side of the valve permit and limit its rotary movement by engagement with the hub of arm 31.

The shafts 30 may be rotated by any suitable means to control the operation of the valve and the consequent functioning of the hydraulic torque transmitter. As shown a centrifugal speed governor F (see Fig. 3) is applied to these shafts which regulates the amount of fluid admitted into the channel by the valve and the speed at which the driven element is revolved by the driving element. This governor may be of any suitable construction, that shown consisting of weighted centrifugal governor arm 35 carried by the outer ends of the shafts 30 and restraining springs 36, each of which is secured by its ends to a lug 37 on the free end of one of the crank arms and to a lever arm 38 radiating from the pivot end of the companion governor arm. At rest condition of the driving element the valve is held closed and no motion is transmitted and at full speed of the driving element the valve is maintained fully open and the driven element revolved by the driving element. Thus the operation of the driven element is entirely automatic and the pick up gradual but positive.

While the fluid employed as a motion transmission means reduces shocks upon and wear and tear of the moving elements of my invention, auxiliary means for augmenting this function may be employed and for this purpose I have applied shock absorbing means G to each of the outer ends of shafts 30. This means may be of any suitable construction and as shown consists of a short lever 40 radiating from and secured to the shaft 30 and formed with a short yoke concentric with the shaft and poised over a stud 42 fixed on the outer surface of the side of section 10 of the housing. A pair of coiled buffer springs 43 in the yoke on opposite sides of the stud 42 serves to augment the absorbtion of all shock and jar automatically. It is not necessary to employ this auxiliary means, the fluid ordinarily serving to absorb all of the shock but when employed wider distribution of any shock is produced.

Among the advantages attained by my improved hydraulic torque transmitter are the following: gradual and smooth pick up between the driving and driven elements with substantially no shock or grabbing; adjustable pick up interval; the device is wholly enclosed and can be applied to substantially any type of driving unit; unlimited power can be transmitted; the device can be effectively operated in horizontal, vertical or inclined position and in either direction of rotation when slightly modified; practically any desired starting condition for the driven element can be obtained; peak load requirements are reduced; shocks are absorbed and wear and tear to both driving and driven units are reduced or prevented; the operation is entirely automatic, safe and highly effective, and the structure permits of neat and compact design. The device requires an interval of time before the fluid becomes distributed uniformly around the work channel. Until this distribution takes place, there is no effective pressure. It is this condition that allows the driving element to attain full speed and best work at once and the driven element is gradually but steadily accelerated to full speed but under the action of a definite lag.

Changes and modifications in construction are contemplated within the spirit of my invention.

I claim:

1. A hydraulic torque transmitter, comprising, two cooperating driving and driven elements rotative about a common axis, one a housing having an inner cylindrical bore and the other a driven disc revoluble within said housing and having an annular series of turbine blades and a deflector on its side, and a rotary disc valve revoluble about said axis in said bore opposite said driven disc cooperating with said housing to form an annular work channel in which said blades revolve and having an inner annular cup toward the inner portion of which said deflector is adapted to direct spent fluid longitudinally from said blades, said housing having a plurality of fluid conducting passages in its bore adapted to distribute streams of fluid evenly into the side of said work channel in the path of said blades and said valve having a series of radiating ports, one for each of said passages and adapted by the rotary movement of the valve in the housing to regulate the flow of spent fluid from within the valve longitudinally into the path of the blades whereby the transmission of power by said elements is regulated.

2. In a structure as defined in claim 1, a plurality of fluid conducting passages in the housing formed by an annular series of evenly spaced longitudinal grooves in an inner surface of the housing with which the ports in the rotary valve are adapted to adjustably register to regulate the flow of fluid outwardly.

3. In a structure as defined in claim 1, the rotary disc valve having an inwardly projecting rim which cooperates with the housing to assist in forming the annular work channel and also to assist in forming the inner annular cup in the valve.

4. In a structure as defined in claim 1, the inner deflector consisting of an annular shoulder on the side of the inner wall of the driven element projecting longitudinally so as to direct spent fluid received from the turbine blades into the cup in the valve.

5. In combination with the structure defined in claim 1, means for rotating the valve to regulate the flow of fluid outwardly therethrough.

JAMES T. DICKSON.